United States Patent [19]
Brundrit et al.

[11] 3,953,826
[45] Apr. 27, 1976

[54] SUPER LONG SEISMIC SOURCE

[75] Inventors: Dennis R. Brundrit, Calgary, Canada; Jacobus C. van Wijnen, The Hague, Netherlands

[73] Assignee: Shell Oil Company, Houston, Tex.

[22] Filed: May 15, 1975

[21] Appl. No.: 577,575

Related U.S. Application Data

[63] Continuation of Ser. No. 446,193, Feb. 25, 1974, abandoned.

[30] Foreign Application Priority Data
Mar. 8, 1973 Canada.................................. 165556

[52] U.S. Cl.............................. 340/7 PC; 340/3 T; 340/8 S; 340/9; 181/120
[51] Int. Cl.²...................... G01V 1/02; G01V 1/13
[58] Field of Search................... 340/3 T, 7 PC, 8 S, 340/9; 114/235 A, 235 B; 181/120, 118

[56] References Cited
UNITED STATES PATENTS

| | | | |
|---|---|---|---|
| 2,449,085 | 9/1948 | Peterson | 340/7 PC |
| 3,354,984 | 11/1967 | Pavey | 340/3 T |
| 3,374,852 | 3/1968 | Strange et al. | 340/7 PC |
| 3,744,021 | 7/1973 | Todd | 340/7 R |
| 3,893,539 | 7/1975 | Mott-Smith | 181/120 |

FOREIGN PATENTS OR APPLICATIONS

| | | | |
|---|---|---|---|
| 1,196,645 | 7/1970 | United Kingdom | 340/7 R |

*Primary Examiner*—Richard A. Farley
*Assistant Examiner*—N. Moskowitz
*Attorney, Agent, or Firm*—Theodore E. Bieber

[57] ABSTRACT

An elongated seismic source for use in marine seismic explorations consisting of individual seismic sources with one or more sources being grouped in an array. A number of arrays are used with each array being individually supported in the water and coupled by a separate cable to a vessel. The cables are arranged for towing the arrays in a straight line while the vessel contains means for individually controlling the length of the cables.

12 Claims, 6 Drawing Figures

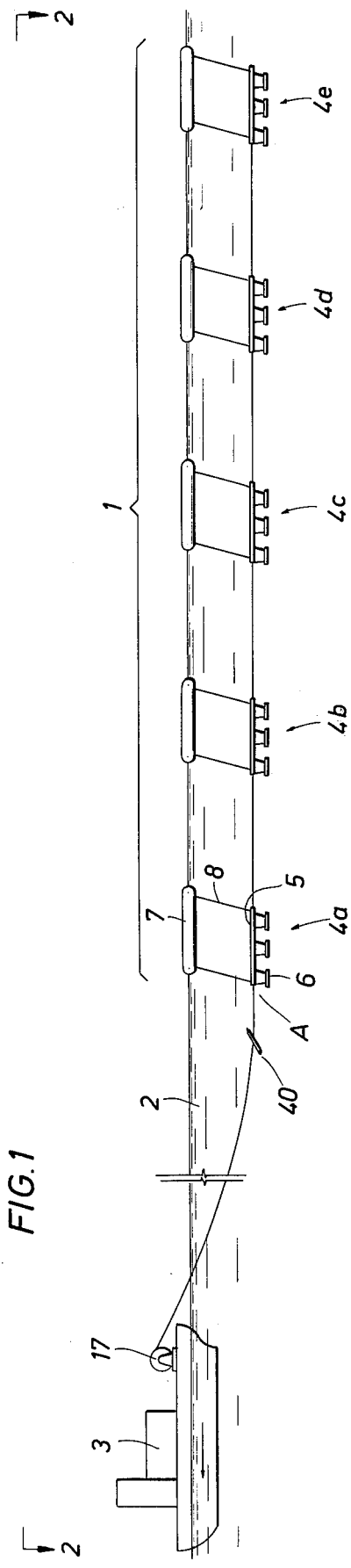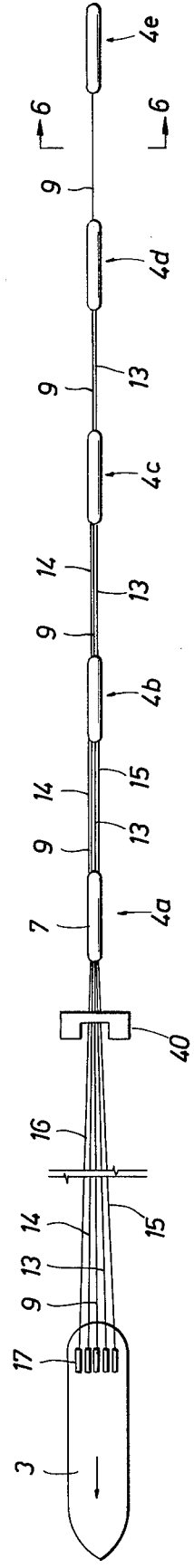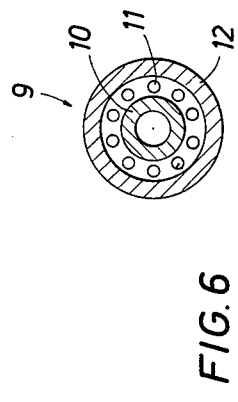

SUPER LONG SEISMIC SOURCE

This is a continuation of application Ser. No. 446,193, filed Feb. 25, 1974, now abandoned.

BACKGROUND OF THE INVENTION

The invention relates to an elongate seismic source for use in marine operations.

To obtain information on substrata located below the sea bottom or ocean bottom, seismic sources adapted for generating a shock wave in the water are towed through the water by one or more towing vessels. The shock wave generated in the water travels in all directions, and part thereof, after having been reflected or refracted by the substrata returns to the body of water overlying the strata that are to be explored, and is subsequently picked up by hydrophones of a detector cable that is towed through the water in the neighborhood of the seismic source. This detector cable may be handled from the same vessel as from which the seismic source is being operated.

The returning reflected signals are recorded, and useful information can be gathered from such recordings to locate the position and depth of oil- or gas-containing formations.

In certain areas, a relatively large part of the shock wave generated by the seismic source does not enter the sea bottom, but is reflected by this bottom. Such reflected wave part is subsequently again reflected by the water surface, and travels for some time between the sea bottom and the water surface until at a certain moment it is picked up by by hydrophones of the detector cable. If this moment coincides with the return of the wave part reflected by the substrata, the origins of the various wave parts cannot be detected properly and the presence of such undesired multiple reflections in the recordings will lead to misinterpretation of the recordings.

By shaping the sound source such that it has a large longitudinal dimension, a kind linear sound source is obtained that is adapted for generating shock waves having a principal direction of wave propagation, which direction is confined to a narrow area on each side of a plane normal through the center of the longitudinal axis of the elongate sound source. Since a shock wave of this type travels in the preferred direction (that is the direction of the wave parts that will be reflected by the substrata and returned to the hydrophones) the influence of reflections that have passed only through the water and have been reflected frequently between the sea bottom and the water surface, is reduced.

A drawback of the known elongate sound sources is that they are very difficult to handle, and cannot be adapted to the depth of the water in which they have to operate.

BRIEF SUMMARY OF THE INVENTION

An object of the present invention is an elongate seismic source for marine operation which seismic source can be efficiently towed by and manipulated from a vessel.

According to the invention, an elongate seismic source for use in marine operations comprises a plurality of individual sound sources that are concentrated in arrays distributed over the length of the elongate seismic source, each array of individual sound sources being adapted for being supported below the water level and for being connected by a separate cable to a vessel, the cables being arranged for towing the arrays in a substantially straight line and for passing signals between the vessel and the individual sound sources for activating these sources.

Means may be provided for varying the lengths of the cables to change the distances between adjoining arrays.

The means for varying the lengths of the cables may comprise a plurality of rotatable drums on which the cables can be stored separately, and actuating means for separately as well as in combination rotating said drums, the cables being arranged to allow a relative displacement of the arrays along the elongate seismic source.

BRIEF DESCRIPTION OF THE DRAWINGS

The invention will be described in more detail with reference to the drawings, which show by way of example one embodiment of the invention.

FIG. 1 of the drawings is a schematic view showing the relative position of a towing vessel and the elongate seismic source according to the invention.

FIG. 2 is a top view of FIG. 1.

FIG. 6 shows schematically a cross-section over a cable taken over the section VI—VI in FIG. 2. The scale of FIG. 6 is larger than the scale of FIG. 2.

PREFERRED EMBODIMENT

Figure 4:
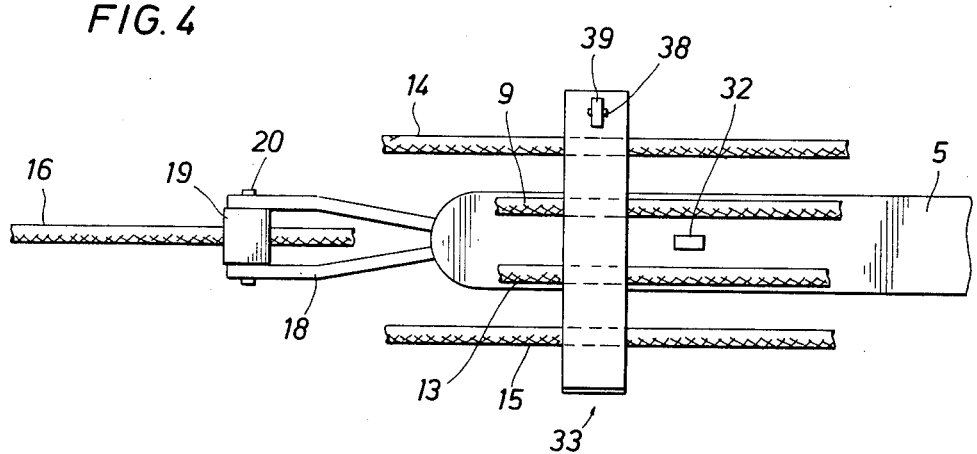
FIG. 4 is a top view of FIG. 3 taken in the direction of arrow IV.

The elongate seismic source 1 shown in FIG. 1 is towed through the water 2 by a towing vessel 3. The elongate seismic source 1 comprises five arrays 4 (indicated by the numerals 4a, 4b, 4c, 4d and 4e); each array consisting of a supporting beam 5 for supporting a plurality of individual sound sources 6. In this particular embodiment of the invention, the sound sources 6 are formed by air guns. Details of the air guns are not shown in the drawing, since such equipment is commercially available. Each air gun comprises a chamber filled with high-pressure air, which air can be decompressed almost instantaneously by opening a quick-acting valve in the wall of the chamber. This decompression generages a shock wave in the water outside the chamber, which shock wave is used as a seismic signal. After decompression, the valve is closed and the chamber is refilled with high-pressure air. Such air guns are marketed by Bolt Associates, Inc., and described in U.S. Pat. No. 3,310,128. The supporting beam 5 of each array 4 is suspended from a float 7 by a suitable suspension means, such as cables 8.

As will be described hereinafter in more detail, each array of individual sound sources 6 is connected to the towing vessel 3 by a separate cable. Such cable is designed for pulling the array through the water, for supplying high-pressure air to the air guns of the array and for passing signals from the towing vessel to the individual seismic sources of the array to activate these sources. A cross-section of such cable 9 (the particular cable 9 being used for towing the rear array 4e of the linear seismic source 1 through the water) is schematically shown in FIG. 6. The cross-section shows a central high-pressure air conduit 10 surrounded by a plurality of signal conduits 11 (each being covered by an insulating layer). The conduits 10 and 11 are placed in an armored envelope 12 and the total strength of all the components of the cable 9 is sufficient to use the cable for pulling an array through the water.

Since each array 4 is connected to the towing vessel 3 by a separate cable, there are — besides cable 9 — other cables 13, 14, 15 and 16, each cable being connected at one end thereof to one of the arrays 4, and with the other end thereof to one of the five drums 17 that are rotatably mounted on the vessel 3. The drums 17 may be conventional cable winches having suitable drive means.

Actuating means (not shown) are mounted on the vessel 3 to actuate the drums 17 separately or in combination. The way in which the drums 17 are operated to reel and unreel the cables will be described hereinafter.

The way in which the cable 16 is connected to the leading array 4a of the elongate seismic source 1 will now be described with reference to the FIGS. 3, 4 and 5.

Figure 3:
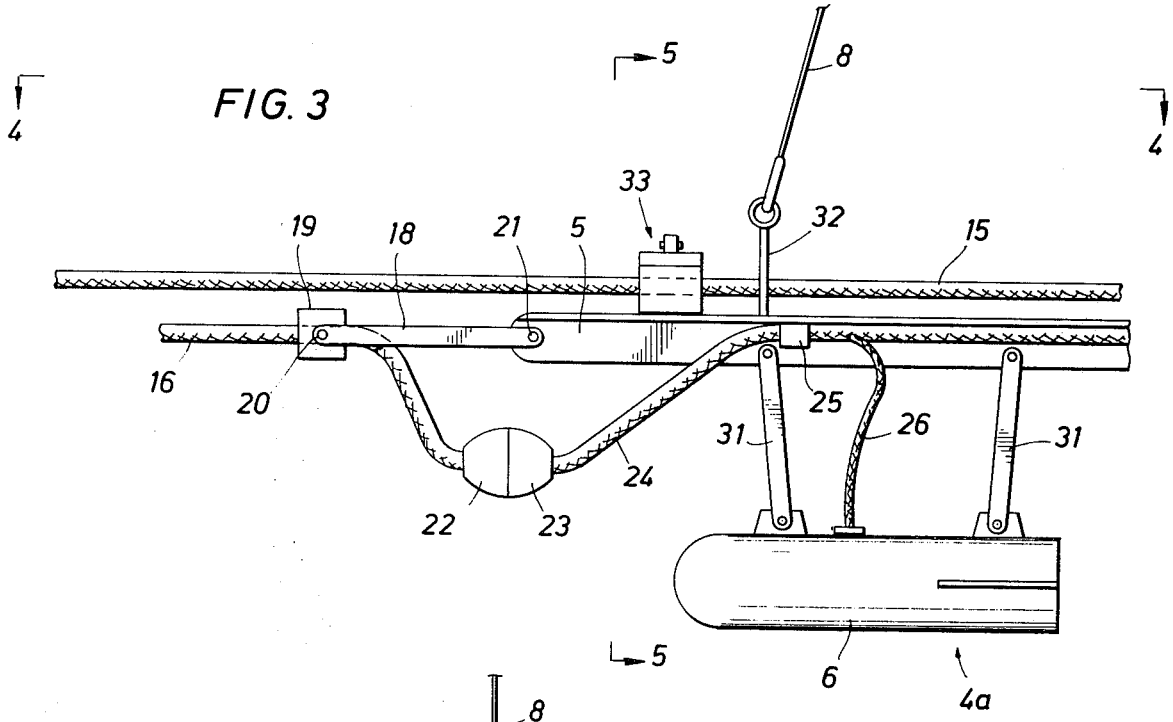
FIG. 3 is a schematic view of detail A of FIG. 1 but on a larger scale, and showing the leading end of the leading array of the elongate sound source according to the invention.

As shown in FIG. 3, the end of cable 16 is hingeably connected to a pair of arms 18 by means of a clamp 19 clamped around the cable 16. Pins 20 mounted on the clamp 19 co-operate with bores (not indicated) in one end of the arms 18. The other ends of arms 18 are connected to the supporting beam 5 by means of a pin 21 passing through openings in the arms and the supporting beam 5. Suitable locking means (not shown) are provided to keep the pin 21 in place during operation. These locking means can easily be unlocked to remove the pin 21 and to uncouple the cable 16 from the support beam 5.

The end of the cable 16 is provided with a plug 22 adapted for co-operation with a counter plug 23 of a cable 24 connected to the beam 5 by clamps 25. The plugs 22 and 23 are multiple plugs (electric and penumatic) and the cable 24 is identical in cross-section to cable 9 shown in FIG. 6. The conduits of cable 24 are connected to the air guns 6 of the array 4a of the elongate seismic source via suitable cables 26.

The air guns 6 are suspended from the supporting beam 5 by rods 31 that are hingeably connected to the beam 5 and the relevant air gun 6. The beam 5 is connected to the float (not shown) by cables 8, one of which is shown in FIG. 3. The lower end of the cable 8 is connected to an eye bolt 32 mounted on the beam 5.

The cables 9, 13, 14 and 15 are connected to the arrays 4e, 4d, 4c and 4b, respectively, which arrays follow the leading array 4a of the elongate seismic source 1 when the latter is towed through the water. These cables are guided along the beam 5 of the leading array 4a of the elongate seismic source 1 by passing them through guide means 33 (see FIGS. 3–5) mounted on the supporting beam 5. The guide means 33 consists of a body 34 welded to the beam 5 and comprising four U-shaped channels 35 that are closed off at the upper end thereof by a lid 36 that is hingeably connected to the body 34 by a hinge 37. The lid 36 can be kept in the position shown in the drawings by a pin 38 mounted in an opening (not indicated) through an upstanding part 39 of the body 34, which part protrudes through an opening in the lid 36.

It will be appreciated that when towing the arrays 4 of the elongate seismic source 1 by the vessel 3 in the manner as shown in FIGS. 1 and 2 of the drawings, the arrays are each separately pulled through the water by one of the cables 9, 13, 14, 15 and 16. The arrays 4 are each supported below the water surface by a float 7 via supporting cables 8, and the leading array 4a is prevented from being pulled upwards by a vane member 40 connected to the cables 9, 13, 14, 15 and 16 at the location indicated in FIGS. 1 and 2. Such vane members are known per se in the field of marine seismic sources and need no further description.

Figure 5:
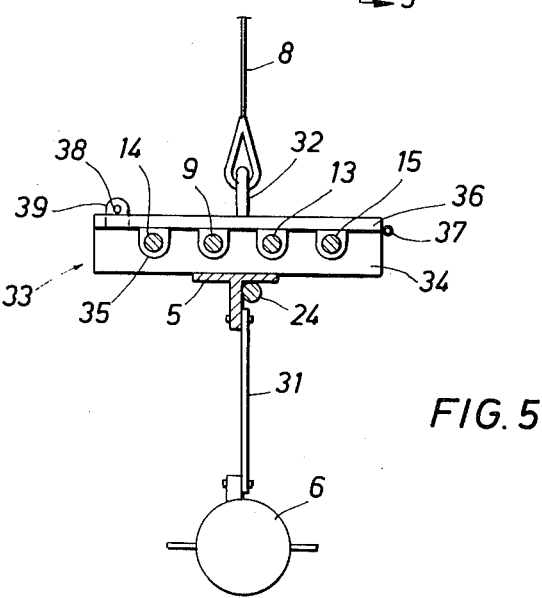
FIG. 5 is a cross-section of FIG. 3 taken over the section V—V of FIG. 3.

It will further be apparent that each supporting beam 5 of each array 4 (with the exception of the rear array 4e) comprises at least one guiding means similar to the guiding means 33 shown in FIGS. 3-5 of the drawings. Whereas four cables are passed along the leading array 4a of the elongate seismic source 1, only three cables are passed along the array 4b next in line, since cable 15 is connected to this array 4b for pulling it through the water. Further, cable 14 is connected to the array 4c and only two cables (9 and 13) are guided along this array 4c. Cable 13 is connected to array 4d and only cable 9 is passed along the array 4d.

All the guide means mounted on the beams of the arrays have openings therethrough similar to the U-shaped openings 35 in the guide means 33 shown in FIG. 5. These openings are sufficiently wide to allow the cable guided therethrough to be pulled therethrough with minimum resistance. Thus, by rotating that drum of the set of drums 17 to which the cable 9 is connected, this cable 9 can be unreeled, whereby the distance between the arrays 4d and 4e can be increased. By reversing the sense of rotation of that particular drum, this distance may be decreased. It will be appreciated that by separately operating the various drums 17, the distribution of the arrays 4 over the length of the elongate sound source 1 may be varied.

The distances between the various arrays may be chosen such that the distance between two adjoining arrays increases from the middle of the elongate seismic source 1 towards both ends thereof.

The distances between the various arrays may be varied during towing of the elongate seismic source through the water. Thus, the distribution of the arrays 4 over the length of the elongate seismic source 1, as well as the length of the source 1 may be varied during oparation of the source.

Also, the distance between the vessel 3 and the seismic source 1 may be varied by simultaneously rotating the drums 17 in the same direction.

When the seismic work is finished in a certain area, the source 1 may be reeled in as follows.

First of all, the drums 17 are rotated in combination to bring the leading array 4a to the vessel 3 to uncouple this array from the rest of the arrays 4. The vane 40 (see FIG. 1) is first removed, and the cable 16 (see FIG. 3) is subsequently uncoupled from the array 4 by removing the pin 21 and uncoupling the plugs 22 and 23. After opening the lid 36 of the guide means 33, the cables 9, 13, 14 and 15 can be freed from the array 4a, and the array 4a together with the float 7 thereof can be lifted out of the water and on the vessel 3. Preferably, the cables 8 between the array and the float are provided with quick-acting couplings to detach the float 7 from the array 4a and store it separately on the vessel 3.

Subsequently, the drums connected to the cables 9, 13, 14 and 15 are rotated simultaneously, and the arrays 4 b–e are pulled together towards the vessel. When the array 4b is near the vessel 3, it is detached from the cable 15 thereof in the same manner as described above. Also, the cables 9, 13 and 14 are detached from the guide means of the array 4b, and this array together with the float thereof, is hoisted aboard the vessel 3 and stored thereon.

The above operation is repeated for the remaining arrays until all the arrays and the floats thereof are stored aboard the vessel 3.

The distance between the leading array 4a and the rear array 4e of the elongate sound source may be adapted to the depth of the sea where the operations take place. For deep seas, this distance may be over one hundred meters, say, between 150–200 meters.

It will be appreciated that the use of a number of arrays distributed along the length of the elongate seismic source, and the application of a separate cable to tow each array allows an efficient handling of elongate seismic sources of great length, and moreover allows such sources to be adapted to varying water depths in a very simple manner.

The invention is not limited to a particular number of individual sound sources 6 installed in a single array. The sources may be arranged in a single row, or in two or more parallel rows. The seismic capacities of each individual sound source is chosen in relation to the seismic wave to be generated by the array to which the particular sound source belongs. The sound sources belonging to a common array are fired simultaneously. However, a limited number thereof (say, one or two) may be fired with a small time delay if the desired shape of the wave to be generated should dictate so.

To direct the shock wave generated by the elongate seismic source 1 in a direction other than the vertical, the arrays may be fired consecutively in one direction along the elongate seismic source with a certain delay time between consecutive firings. Such delay time between consecutive firings of adjoining arrays may be up to about 100 milliseconds, or greater.

The seismic capacities of the arrays of the elongate sound source may be equal to each other wherein seismic capacity refers to the seismic energy released by each array each time the sources are fired in unison. However, the invention is not restricted hereto, and elongate seismic sources may be built up of arrays having different capacities. In such elongate seismic source, the seismic capacities of the arrays may decrease from the middle of the elongate sound source towards both ends thereof.

To control the operation and the signal shape of the shock wave generated per individual array, a hydrophone or other detecting means may be included in each array, which hydrophone is connected to a recording apparatus aboard the vessel via some of the conduits 11 of each cable (see FIG. 6).

Application of the invention is not restricted to elongate seismic sources of which the arrays comprise air guns as individual seismic sources. Any other type of seismic source suitable for the purpose may be applied, such as gas exploders using the explosion of combustible gas mixtures for wave generation or sparkers generating electric sparks between two electrodes in the water.

The rigid beams 5 (see FIG. 3) of the arrays may be of any type suitable for the purpose. An attractive way of supporting the air guns 6 is further to dispense with the beam t and to connect the supporting rods 31 to the cable 24. The cable in its turn is then supported at a plurality of points by the float by means of cables similar to cable 8. In this modified construction of an array, the guide means 33 is carried by the cable 24, and the plug connection 22, 23 is relieved from axial load thereon by connecting the ends of the arms 18 (which ends were originally connected to the beam 5) to the cable 24.

The individual sound sources 6 may be concentrated in any amount of arrays distributed along the length of the elongate seismic source 1.

The array 4a shown in FIGS. 3–5 of the drawings is equipped with only a single guide means 33 for guiding the cables attached to the rest of the arrays therealong. However, the invention is not limited to the use of a single guide means per array. More than one such guide means may be used. Moreover, any other type of guide means may be applied, provided that the passages through the guide means are sufficiently wide to allow pulling the cables therethrough, and that the cables can be easily entered into and removed from the guide means.

To maintain a sufficient air pressure within the air guns when transferring them from the vessel 3 into the water 2 or vice versa, each of the drums 17 may carry a high-pressure air bottle rotatably arranged with the relevant drum and provided with means to couple the bottle to the high-pressure conduit of the cable stored on the relevant drum. When the seismic source 1 is in its operating position, all the high-pressure conduits are coupled to a compressor and the communication with the high-pressure bottles is closed off.

The elongate seismic source may be applied either alone or in combination with other elongate seismic sources of the same type to generate shock waves having a principal direction of wave propagation. When towing a single elongate sound source through the water, the arrays thereof will be in a substantially straight line and form a linear sound source which on activation of the individual sound sources thereof generates a shock wave having a direction confined to a narrow area on each side of a plane normal through the center of the longitudinal axis of the single elongate sound source. When towing a plurality of elongate seismic sources parallel to each other through the water such that the arrays of each source are in a substantially straight line, an areal seismic source will be formed. When the individual sound sources are all in a horizontal plane and fired simultaneously, the direction of the shock wave will coincide with the vertical.

The distance between each pair of adjoining elongate seismic sources of the areal seismic source may be between 50 and 100 meters.

We claim as our invention:

1. An elongated seismic source for use in marine seismic explorations wherein a vessel is used to tow the source over areas being surveyed, said source comprising;

a plurality of individual seismic sources, said sources being concentrated in several distinct arrays, each array having at least one source;

a plurality of support means, the seismic sources of each array being coupled to an individual one of said support means;

a plurality of flotation means, at least one flotation means being attached to each support means; and a plurality of cables, each of said cables being attached to the support means of an individual array to tow said array and pass signals and power between the vessel and said particular array, said plurality of cables being disposed to tow all of said arrays of the elongated source in a substantially in-line arrangement.

2. Elongate seismic source according to claim 1, wherein means are provided on said vessel for varying the lengths of the cables to change the distance between adjoining arrays.

3. Elongate seismic source according to claim 2, wherein the means for varying the lengths of the cables is adapted for being mounted aboard the vessel and comprises a plurality of rotatable drums on which the cables can be stored separately, and actuating means for separately and in combination rotating said drums, the cables being arranged to allow a relative displacement of the arrays along the elongate seismic source.

4. Elongate seismic source according to claim 2, wherein the lengths of cable are controlled so that distances between adjoining arrays increase from the middle of the elongate seismic source towards both ends thereof.

5. Elongate seismic source according to claim 1, wherein all arrays have substantially the same seismic capacity.

6. Elongate seismic source according to claim 1, wherein the seismic capacities of the arrays decrease from the middle of the elongate seismic source towards both ends thereof.

7. Elongate seismic source according to claim 1, wherein the seismic capacities of the arrays decrease from the middle of the elongate sound source towards both ends thereof and all adjoining arrays are located at the same distance from each other.

8. Elongate seismic source according to claim 1, wherein the distance between the two arrays situated near the ends of the elongate seismic source is at least one hundred meters.

9. Elongate seismic source according to claim 1, wherein the distance between the two arrays situated near the ends of the elongate seismic source is between one hundred and fifty and two hundred meters.

10. A method for generating seismic impulses in a body of water comprising:
    forming a plurality of arrays, each array being formed from at least one seismic source;
    individually supporting and floating each of said arrays;
    positioning the arrays in spaced positions along a straight line; and
    separately towing each of the arrays through the water while maintaining the arrays in said spaced positions and straight line.

11. The method of claim 10 and in addition individually varying the spacing between at least two adjacent arrays by varying the length of at least one of the towing cables attached to said adjacent arrays.

12. The method of claim 11 and in addition varying the length of at least one of the towing cables while towing the arrays through the water.

* * * * *